(12) United States Patent  
Kuehnel et al.

(10) Patent No.: US 7,735,145 B2  
(45) Date of Patent: Jun. 8, 2010

(54) PORTABLE SECURE MEDIA WITH TIMED ERASURE

(75) Inventors: Thomas W. Kuehnel, Seattle, WA (US); Shannon J. Chan, Bellevue, WA (US); Dale A. Sather, Seattle, WA (US); Guillaume Simonnet, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1347 days.

(21) Appl. No.: 11/062,261

(22) Filed: Feb. 18, 2005

(65) Prior Publication Data

US 2006/0236409 A1    Oct. 19, 2006

(51) Int. Cl.
*G06F 13/00* (2006.01)
*G06F 13/372* (2006.01)

(52) U.S. Cl. .................... 726/36; 711/100; 711/166

(58) Field of Classification Search ............... 726/36; 711/100, 166

See application file for complete search history.

(56) References Cited

U.S. PATENT DOCUMENTS

| | | | | |
|---|---|---|---|---|
| 4,672,376 A | * | 6/1987 | Lewiner et al. | 340/5.28 |
| 4,980,679 A | * | 12/1990 | Klaubert | 345/50 |
| 6,338,114 B1 | * | 1/2002 | Paulsen et al. | 711/112 |
| 6,842,105 B1 | * | 1/2005 | Henderson et al. | 340/5.73 |
| 6,886,069 B2 | * | 4/2005 | Kawaura | 711/102 |
| 7,028,908 B2 | * | 4/2006 | Kuroda et al. | 235/486 |
| 7,051,157 B2 | * | 5/2006 | James | 711/115 |
| 7,110,836 B2 | * | 9/2006 | Sturm et al. | 700/83 |
| 7,350,038 B2 | * | 3/2008 | Kikuchi et al. | 711/154 |
| 2004/0064532 A1 | * | 4/2004 | Schacht et al. | 709/221 |
| 2005/0149204 A1 | | 7/2005 | Manchester et al. | |
| 2005/0193103 A1 | | 9/2005 | Drabik | |

OTHER PUBLICATIONS

Kim et al., Design and Implementation of Home Network Systems Using UPnP Middleware for Networked Appliances, 2002, IEEE, pp. 963-972.*

* cited by examiner

*Primary Examiner*—Kambiz Zand
*Assistant Examiner*—William S Powers
(74) *Attorney, Agent, or Firm*—Marshall, Gerstein & Borun LLP (57) ABSTRACT

A timed erasure mechanism can be used with portable computer-readable media to ensure automatic erasure of secure information, minimizing the security risks in using such media to store and transport passwords, codes, keys and similar private setup information. The portable computer-readable media can comprise volatile memory and a timed erasure mechanism in the form of a power supply and discharging circuitry that discharges the power supply after a predetermined amount of time. Alternatively, the portable computer-readable media can comprise nonvolatile memory and a timed erasure mechanism in the form of a digital time and erasure algorithms that are initiated after a predetermined amount of time. Furthermore, such portable computer-readable media can comprise a container that bears unique physical properties that can alert users to the volatile nature of the media.

16 Claims, 7 Drawing Sheets

PORTABLE SECURE MEDIA WITH TIMED ERASURE

FIELD OF THE INVENTION

This invention relates generally to secure computer-readable media and, more particularly, relates to a portable computer-readable medium that automatically erases its data at predefined intervals to maintain the confidentiality of that data.

BACKGROUND

Because of the ever increasing threat of malicious code and individuals who seek to profit from stolen computing resources or information, computing environments are becoming more secure, and, simultaneously, more difficult for average users to set up and access. For example, many modern home networks rely on wireless communication technology, eliminating the need to physically connect each of the computing devices. However, such wireless networks cannot physically limit their reach to ensure that only the intended beneficiaries have access. As a result, a user who wishes to set up a wireless home network faces a daunting task of selecting from among a variety of security mechanisms, many of which require various security keys and passwords, and then ensuring that every device that is to be granted access to this network shares these keys, passwords and mechanisms. Furthermore, to provide a sufficient level of protection, the keys and passwords are often many characters in length, such that, even if the user did not have to memorize them, merely entering them in via manual entry requires a significant amount of time and effort on the part of the user. Should the user make even one error, the key or password will be rejected, and access to the network will be denied.

Even for networks that have been professionally installed, such as corporate wireless networks, each individual user is still required to perfectly enter security information and insure that the security information is not inadvertently changed or deleted. Should the user wish to use another computing device, or should the user accidentally change or delete their security information, the user will be forced to obtain new security information, and then enter it. As a result, many corporations are forced to provide support staff whose task is to ensure that each intended user can properly access the corporation's wireless network.

Furthermore, emerging standards, such as the Universal Plug and Play (UPnP) standard, are merging computer networks with more common household appliances, such as audio and video equipment. Consequently, users can be forced to troubleshoot complex security mechanisms even to perform tasks as simple as connecting one audio or video device to another. For example, to enable a UPnP control point, such as a receiver or television to operate a UPnP device, such as a DVD player or video recorder, the user may be forced to properly identify a security code or the like associated with the DVD player or video recorder, and then correctly enter that code when prompted by the receiver or television. Often, the security code is imprinted on the DVD player or video recorder, requiring the user to either physically move the unit until it is in close proximity to the receiver or television, so that the user can read and enter the code, or the user is forced to transcribe, or memorize, the code before entering it into the receiver or television.

To aid users when setting up or accessing wireless networks, installing new UPnP devices, and performing like tasks, automated computer-executable instructions in the form of "wizard" programs have been developed. Such wizards guide the user through a series of steps via simple and understandable commands. Additionally, to avoid burdening the user with various security mechanisms, keys, codes, passwords, and the like, the wizards can be programmed to store and retrieve such information from computer-readable media that the user can transport from one device to another. For example, in setting up a wireless network, a wizard on one computing device can guide the user through the necessary steps, and can even select random passwords and keys of sufficient length, and can then prompt the user to insert portable computer-readable media onto which the wizard can store all of the relevant information. A subsequent wizard at another computing device, wireless access point, or wireless peripheral, can, after the user has transferred the portable computer-readable media to that device, automatically read the information stored thereupon and can automatically configure the device to operate with the user's wireless network. Similarly, simple wizards on UPnP-compliant equipment can simply record the unit's security code so that the user can connect a UPnP device in one room with a UPnP control point in another room by simply transferring the security code via the portable computer-readable media, saving the user the trouble of finding the printed security code, transcribing it, and then entering it properly.

Unfortunately, the most ubiquitous forms of portable computer-readable media, including so called USB "thumb drives", Compact Flash (CF) cards, Secure Digital (SD) cards, and the like are often used for a variety of purposes and store a variety of information. For example, CF and SD cards are traditionally the native computer-readable medium used by digital cameras and, as such, often contain many photographs. Similarly, USB drives are often used to temporarily store and transport commonly used computer-readable files, such as word processing documents and spreadsheets. Because such portable computer-readable media are used for a variety of tasks, there exists a significant risk that any security codes, keys, passwords, or similar information that has been stored on them could be compromised. For example, USB drives, because of their small size and their frequent use, can be lost or misplaced. Similarly, synchronization programs may inadvertently copy all of the data off of CF and SD cards when all the user intended was to provide a friend or family member with the latest photographs.

Therefore, what is needed is specialized portable computer-readable media that can leverage existing manufacturing techniques and standards, and yet be reserved strictly for use in transporting security information, such as codes, keys, passwords and the like, or other data that may be used by automated wizard software to enable users to conveniently set up and access computing and household devices in a secure manner.

BRIEF SUMMARY OF THE INVENTION

Therefore, in one embodiment of the present invention, a portable computer-readable medium in a common format, such as a USB drive, or CF or SD card, can comprise circuitry to provide for automatic erasure of its contents within a predefined time period.

In another embodiment, the predefined time period is reset if the portable computer-readable medium is connected to a powered computing device.

In a further embodiment, the automatic erasure can occur due to a lack of sufficient voltage to properly retain the information stored in the portable computer-readable medium. A timed voltage decrease can be achieved through circuitry comprising a capacitor or similar electricity storage device that discharges over a predetermined time period.

In a still further embodiment, the automatic erasure can be triggered by a digital timing mechanism incorporated with the portable computer-readable medium.

In a still further embodiment, the portable computer-readable medium can be incorporated within a stylized physical enclosure to visually signal its volatile nature so that users do not mistakenly attempt to archive information on the portable computer-readable medium for extended periods of time.

Although the descriptions herein focus primarily on providing power for a limited amount of time to computer-readable media that require power to maintain data and the incorporation of an automatic erasure mechanism with commonly used computer-readable media, it will be appreciated that the descriptions are equally applicable to any type of computer-readable media. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Fueled by exponential increases in storage density, portable computer-readable media have become commonplace. For less than $100, users can purchase a matchbox-sized device that is capable of storing months worth of photos, hundreds of songs or thousands of work-related files such as word processing documents and spreadsheets. Furthermore, because of the small size of these devices, users often carry such devices with them, making them even more useful than prior generation technology, such as floppy disks and removable cartridges. The ubiquitous nature of such devices have enabled hardware and software developers to rely on them to ease users' burdens in setting up or accessing secure computing networks, resources and device. For example, such portable computer readable media can be used to store and transfer complex security settings, including computer-generated passwords, security keys and codes, and similar information.

To maintain the security of any computing environment, device, or resource, however, it is necessary that the security information, such as passwords, keys, codes and the like remain secret. However, due to their small size and frequent use, portable computer readable media are often lost, misplaced, introduced into environments that are not secure, or otherwise compromised, risking inadvertent disclosure of the secure information stored thereon. By providing mechanisms by which the contents of such portable computer-readable media are erased on a timed basis, any security risks can be minimized. For example, if the data stored on a portable computer-readable medium was erased every hour, even if the device was lost or compromised such that unintended users were able to access the security data stored therein, such unintended users would have very little time to exploit such information. Conversely, an hour would provide more than ample time when the portable computer-readable medium was used for its intended purpose, such as setting up a secure environment, or conveying security information from one device to another.

Figure 1:
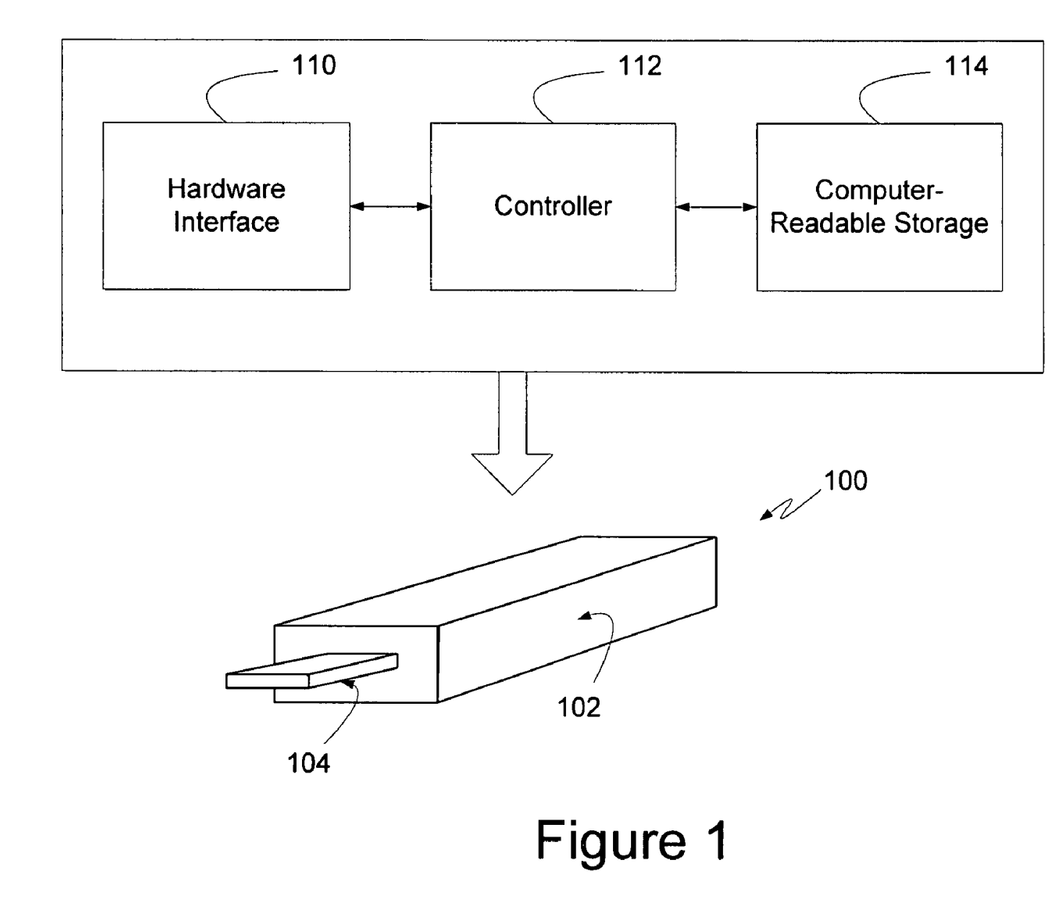
FIG. 1 is a block diagram generally illustrating a known exemplary portable computer-readable medium.

Turning to the drawings, wherein like reference numerals refer to like elements, the invention is illustratively described as implemented within the context of portable volatile and nonvolatile computer-readable media, such as the portable computer-readable medium 100 shown in FIG. 1. Although not required, embodiments of the invention will also be described in the general context of computer-executable instructions, such as program modules, being executed by a processing unit. Generally, program modules include routines, programs, objects, components, data structures, and the like that perform particular tasks or implement particular abstract data types. Moreover, those skilled in the art will appreciate that the invention may be practiced with many different formats and packages of computer-readable memory including, but not limited to, Compact Flash (CF) cards, Secure Digital (SD) cards, Universal Serial Bus (USB) "thumb drives", USB and IEEE 1394 hard drives, and other portable memory.

In the description that follows, the invention will be described with reference to acts and symbolic representations of operations that are performed by one or more processing units or computer-readable media, unless indicated otherwise. As such, it will be understood that such acts and operations, which are at times referred to as being computer-executed, include the manipulation by the processing unit, and storage by the computer-readable media of electrical signals representing data in a structured form. This manipulation transforms the data or maintains it at locations in the computer-readable media, which can control the operation of a computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented via direct wiring or other purely hardware mechanisms.

Turning again to FIG. 1, a portable computer-readable medium 100 is illustrated visually comprising a container 102 and an appropriate connector 104. In the example of FIG. 1, the portable computer-readable medium 100 is illustrated as a USB drive and the connector 104, therefore, is a male USB plug. Alternatively, the portable computer-readable medium 100 could be a CF card, in which case the connector 104 could comprise a socket having two rows of inputs. Similarly, if the portable computer-readable medium 100 was an SD card, the connector 104 could comprise a series of exposed contacts. Additional variants of the portable computer-readable medium 100 would likewise have corresponding connectors corresponding in a manner familiar to those skilled in the art.

The container 102 is generally a plastic or metallic shell surrounding circuitry comprising components such as the hardware interface 110, the controller 112, and the computer-readable storage 114. The hardware interface 110 can implement the communications protocols associated with the type of connector 104. For example, if the connector 104 is a USB male plug, then the hardware interface 10 can implement data transfer consistent with the USB specification, such as attaching a Token Packet and a Status Packet to outgoing data and decoding incoming USB packets. Similarly, if the connector 104 was a series of exposed contacts along the edge of an SD card, the hardware interface 10 could interpret commands received through the Command pin and could send and receive information in an appropriate format via the Data I/O pins.

The controller 112 can provide the circuitry to store information in the computer-readable storage 114 and read information from the storage 114. For example, if the computer-readable storage 114 is flash-based, the controller 112 can provide support for single level cell or multi-level cell flash storage technology in order to be able to store and retrieve data. In addition, the controller 112 can provide hardware error correction, data buffering, scratchpad functionality and/or a phase locked loop for timing. Further format-specific functionality can be provided by the controller 112 depending on the requirements of the computer-readable storage 114. Additionally, as will be known to those skilled in the art, in an effort to reduce cost, the above described functionality attributed to the hardware interface 110 and the controller 112 can often be co-located on a single processing unit.

The circuitry that physically stores the computer-readable data is represented in FIG. 1 by the computer-readable storage component 114. As will be known to those skilled in the art, the computer-readable storage 114 can be any of several types of volatile or nonvolatile storage circuitry, including complementary metal oxide semiconductor (CMOS) RAM, self-powered RAM (including both dynamic RAM (DRAM) and static RAM (SRAM)), erasable programmable read-only memory (EPROM), electrically erasable programmable read-only memory (EEPROM), a variant of EEPROM commonly referred to as "flash memory", and similar storage circuitry. Generally, most devices that are like the portable computer-readable medium 100 comprise flash memory or a similar nonvolatile storage circuitry. The computer-readable storage 114 comprises a multitude of storage units, referred to as "gates" for some of the above-listed types, each of which represents a single binary value. By controlling the electrical charges maintained at the gates, the portable computer-readable medium 100 stores information in a computer-readable format. While some embodiments of the invention leverage the nature of certain types of volatile storage circuitry which require a threshold voltage and/or current in order to maintain the electrical charges at the gates, and thereby maintain data, other embodiments of the invention can use dedicated erasure algorithms and can, therefore, be used with any type of memory, including nonvolatile memory that can retain data even in the absence of electrical power.

Figure 2:
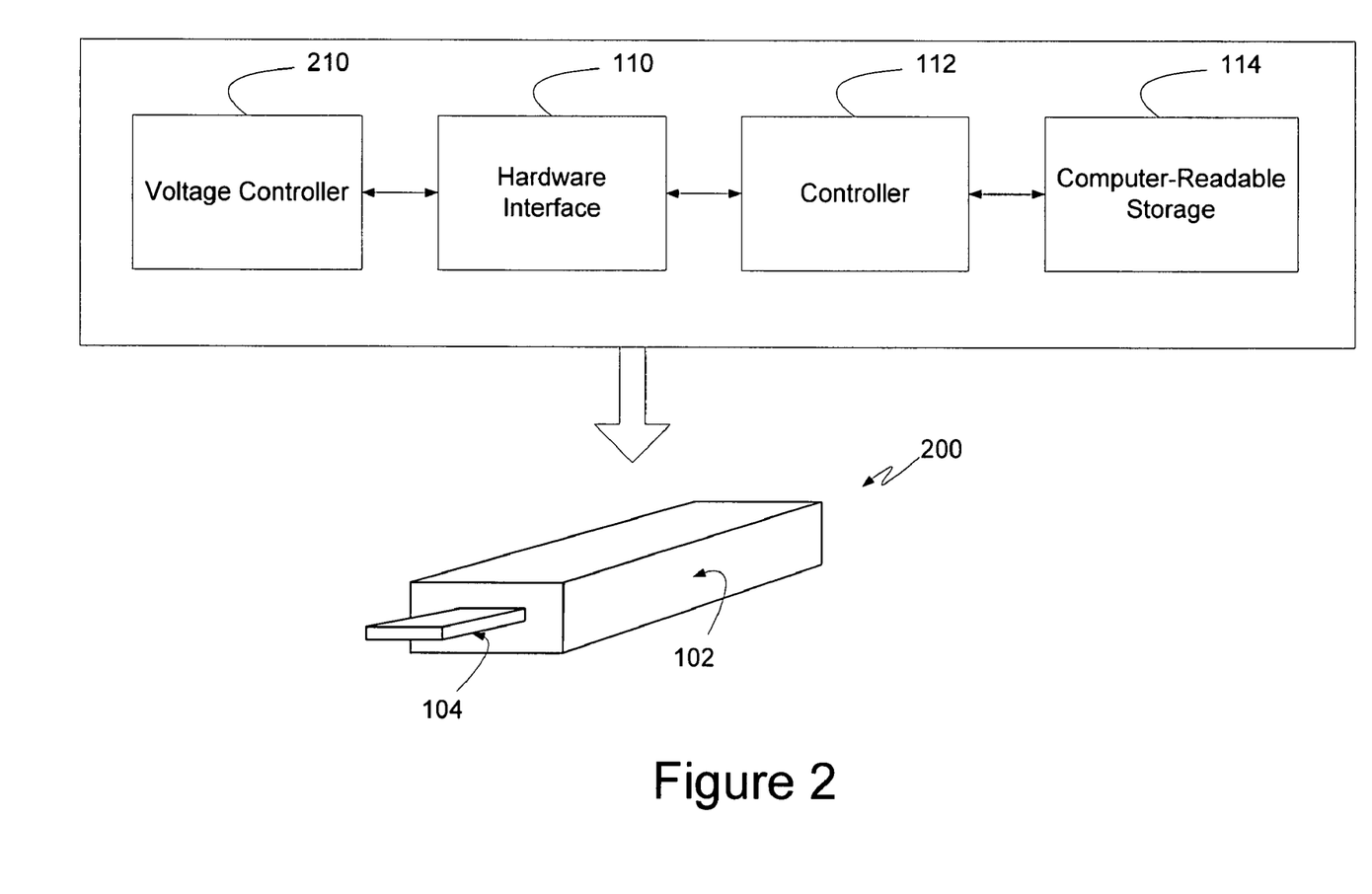
FIG. 2 is a block diagram illustrating a portable volatile computer-readable medium according to one embodiment of the present invention.

Turning to FIG. 2, a portable volatile computer-readable medium 200 is illustrated, which can be manufactured using known containers, such as container 102 and known connectors, such as connector 104. As explained in detail above, the connector 104 can be any of several different types of connectors and the container 102 can comprise a hardware interface 110, corresponding to the type of connector 104, a controller 112, which, as indicated above, may be co-located with the hardware interface 110, and computer-readable storage 114. The computer-readable storage 114 can also comprise volatile storage of any of several different types. As will be described in detail below, the device 200 can comprise a voltage controller 210, illustrated in FIG. 2, that can supply power to the volatile storage 114.

As will be recognized by those skilled in the art, volatile storage requires the availability of at least a minimal power source, supplying a threshold voltage and current, in order to properly maintain the charge at various gates and, thereby, maintain the integrity of the data stored in the computer-readable storage 114. According to one embodiment of the present invention, a voltage controller 210 can be used such that the voltage and/or current are designed to drop below threshold levels after a predefined interval, effectively erasing any data stored in the volatile computer-readable storage 114.

When the voltage and/or current drop below threshold levels, the data stored in the volatile computer-readable storage 114 may not instantaneously erase. Rather, via mechanisms known to those skilled the art, the data can become subject to thermal noise and other random environmental factors. Consequently, for any particular piece of information stored in the volatile computer-readable storage 114, such as a password or security key, only a few bits of that information may have become corrupted. Nevertheless, such corruption would change the overall value of the information, thereby providing an incorrect password or security key. From a security vantage point, such errors achieve the goal of preventing access, by unauthorized users, to security information which could be used to compromise an otherwise secure computing environment. However, the legitimate user of the portable volatile computer-readable medium 200 may not know that the predetermined time limit has expired and that the data stored in the volatile computer-readable storage 114 may no longer be accurate. Consequently, without more, the legitimate user may attempt to properly use the portable volatile computer-readable medium 200 to gain access to computing environments and resources that the user is legitimately entitled to.

To avoid user confusion, one mechanism contemplated by an embodiment of the present invention that can be used in conjunction with the voltage controller 210 is a checksum or similar data integrity system that can be implemented by the controller 112. Specifically, the controller 112 can store a checksum or like value together with any data that the controller writes to the volatile computer-readable storage 114. If the power supplied by the voltage controller 210 falls below threshold values because an excessive amount of time has elapsed, the gradual degradation of the information stored in the volatile computer-readable storage 114 can be detected by the controller 112 prior to transferring any data from the volatile storage 114. As will be known by those skilled in the art, if either the checksum value or the corresponding data have been affected, the controller 112 can detect the discrepancy between the checksum and the corresponding data, and can erase the data, or otherwise prevent its transfer. In such a manner, the voltage controller 210 can effectively destroy the data stored in the volatile computer-readable storage 114 via natural processes associated with the dropping of the supplied voltage and/or current below threshold levels.

Figure 3:
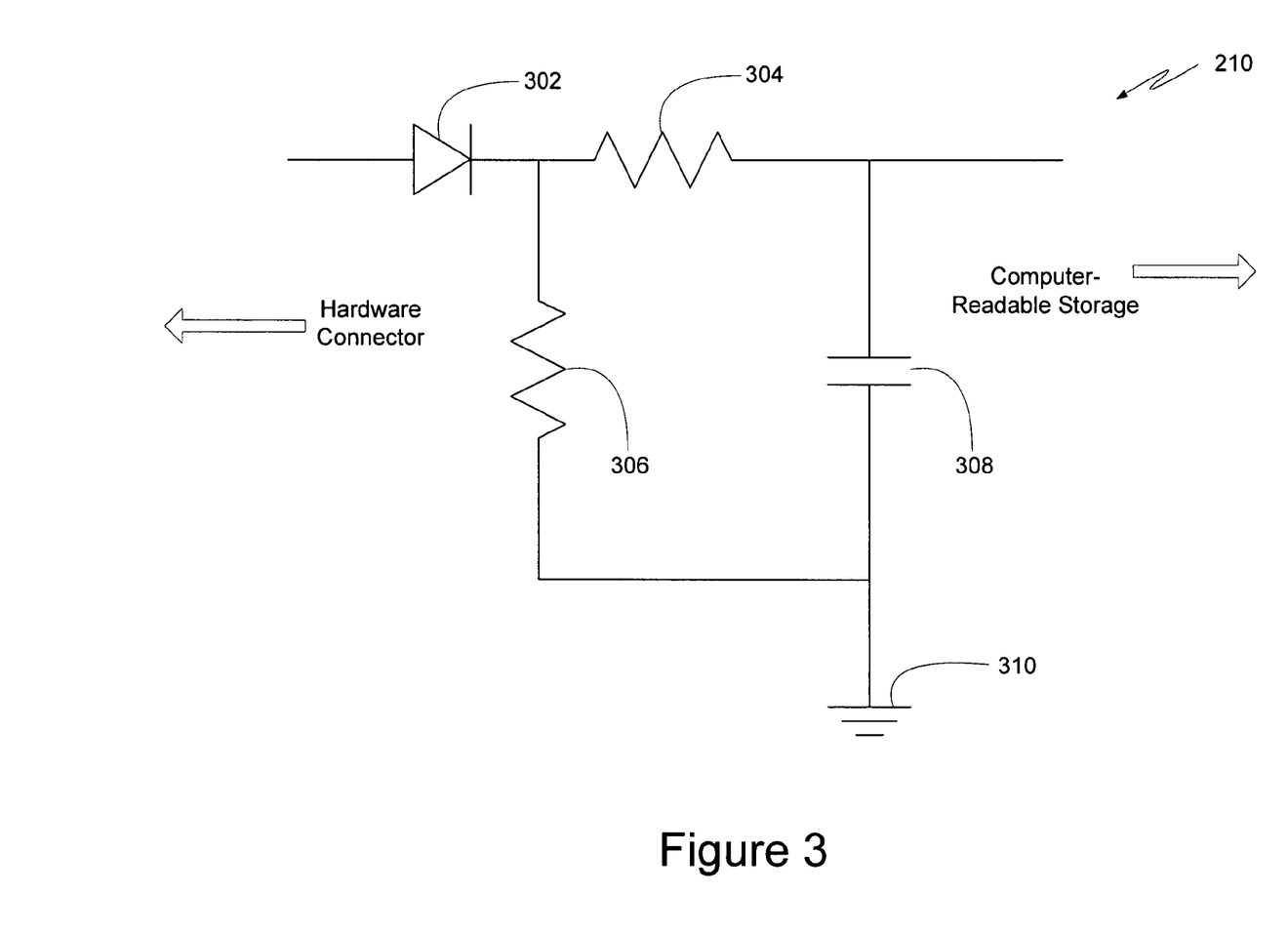
FIG. 3 is a schematic diagram illustrating a simplified timer mechanism contemplated by an embodiment of the present invention.

FIG. 3 illustrates a simplified exemplary voltage controller 210 contemplated by an embodiment of the present invention. Specifically, as illustrated, a capacitor 308, or similar energy storage device, can charge itself while the portable volatile computer-readable medium 200 is connected to a computing device, peripheral or other source of power. The diode 302, or similar one-way circuitry, can enable the flow of current to the capacitor 308 when power is provided through the hardware connector 104, while simultaneously limiting the discharge of the capacitor 308 should the portable volatile computer-readable medium 200 be connected to a computing device or peripheral that is not powered. Resistor 304, or similar current-limiting circuitry, can limit the current drawn by the capacitor 308 when the portable volatile computer-readable medium 200 is connected to a computing device or peripheral. As will be known by those skilled in the art, the amount of current supplied through various types of connectors can be limited. For example, if the hardware connector 104 is a USB connector, then the resistor 304 can be selected to ensure that the capacitor 308 does not draw more than 500 mA of current, pursuant to the USB specification. The resistor 304 can likewise be adjusted for the CF card or SD card specifications, or for any other hardware connection specification. Resistor 306, on the other hard, can serve to discharge the capacitor within the predetermined time frame. Consequently, resistor 306, or similar power-dissipating circuitry, can be selected to provide a discharge cycle for the capacitor 308 sufficient to ensure that the capacitor 308 cannot deliver the threshold voltage and/or current to the volatile computer-readable storage 114 after a predetermined amount of time.

When connected to a computing device, peripheral, or other power supply, the capacitor 308 is charged via current flowing through the capacitor 302 and resistor 304. Once the portable volatile computer-readable medium 200 is disconnected, or once power is no longer supplied, the capacitor 308 begins to discharge through the resistor 306 and the predetermined amount of time, during which the data stored in the volatile computer-readable storage 114 remains valid, begins to expire. Should the portable volatile computer-readable medium 200 be reconnected to a power supply prior to the expiration of the predetermined amount of time, the capacitor 308 can recharge itself, and the time remaining until the data stored in the volatile computer-readable storage 114 becomes unusable becomes reset.

The predetermined amount of time, set via the selection of resistor 306, or similar power-dissipating circuitry, can be selected based on the intended, proper use of the portable volatile computer-readable medium 200. While more detailed descriptions will be provided below, one potential use for the portable volatile computer-readable medium 200 can be as a temporary transfer mechanism that can be used to enable a user to conveniently transfer security information from a Universal Plug and Play (UPnP) device to a UPnP control point. Generally such UPnP devices and control points are physically located within close proximity to one another, such as in a user's home. Consequently, the user will likely be able to plug the portable volatile computer-readable medium 200 into a UPnP device, have the necessary security and setup information transferred, unplug the portable volatile computer-readable medium 200 and carry it to a UPnP control point, plug it in, and have the necessary information transferred within a matter of minutes. A portable volatile computer-readable medium 200 for use with such a system can use a predetermined erasure time of one hour or less. Conversely, the portable volatile computer-readable medium 200 can also be used to transfer security information, settings, and even applications from one computing device on a corporate network to another device that seeks to gain access to that network. In such a case, the two computing devices may be physically distant from one another. In addition, the devices may also be in locations that are not always accessible, such as individual offices or, in the case of portable computing devices, the devices may be wholly removed from the corporate environment for a period of time. Consequently, a portable volatile computer-readable medium 200 for use corporate Information Technology (IT) staff can use a predetermined erasure time of a day or more. In either case, however, the timed erasure of the information on the portable volatile computer-readable medium 200 provides greater security than if the sensitive information was allowed to remain indefinitely.

Figure 4:
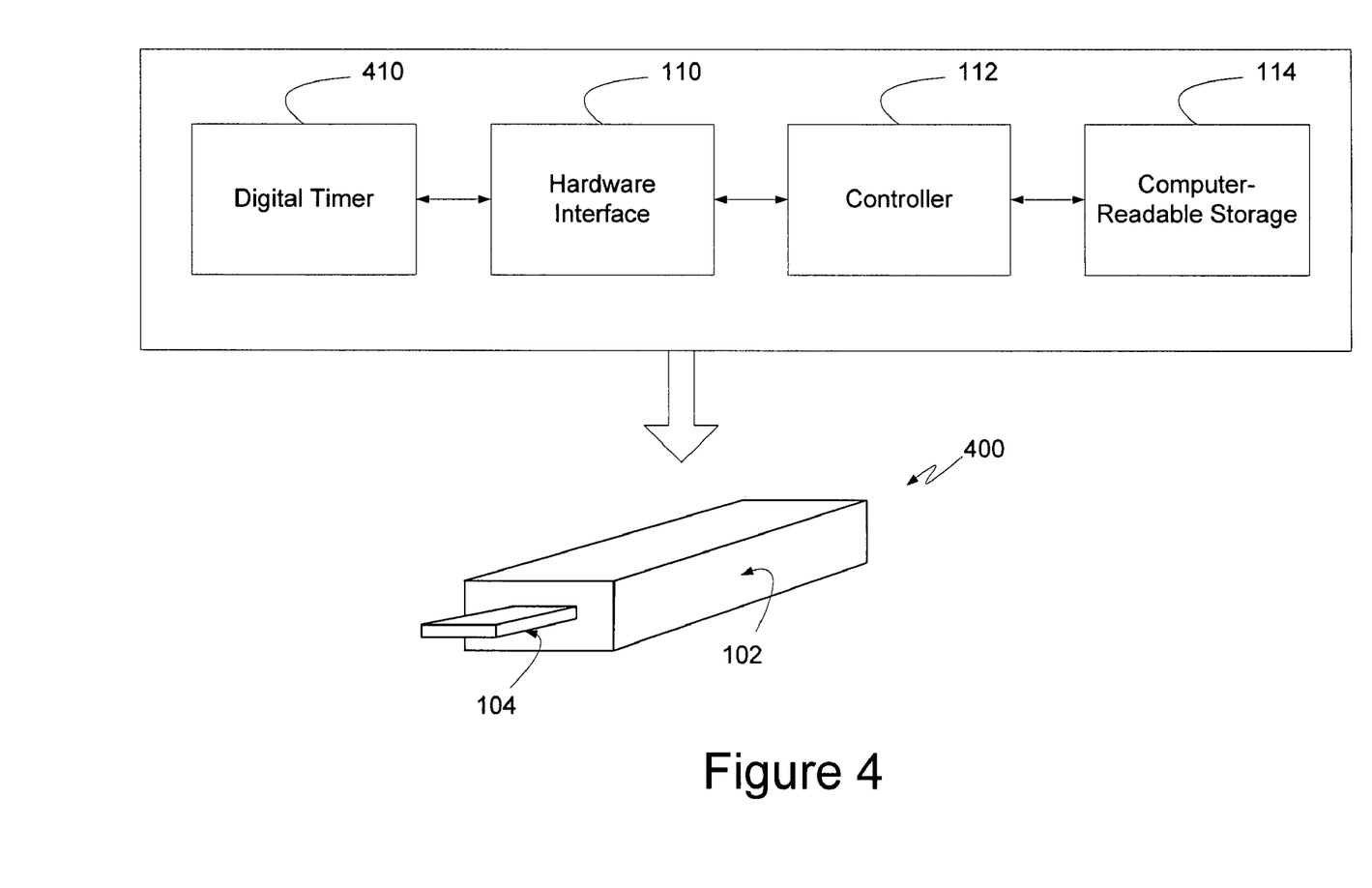
FIG. 4 is a block diagram illustrating a portable volatile computer-readable medium according to another embodiment of the present invention.

Rather than relying on a passive timer system, such as the voltage controller 210 described in detail above, an alternative mechanism contemplated by an embodiment of the present invention uses a digital timer 410, or other more precise timing mechanism, to trigger an active erasure of all of the information in the computer-readable storage 114. Turning to FIG. 4, a portable volatile computer-readable medium 400 is illustrated, again physically comprising a connector 104 and a case 102. As before, the case 102 can enclose a hardware interface 110, a controller 112, that may be co-located with the hardware interface 110, and computer-readable storage 114. In addition, however, the portable volatile computer-readable medium 400 can also comprise a digital timer 410, which can be used to precisely measure a predetermined amount of time, and then trigger a complete and active erasure of the data stored in the computer-readable storage 114. Because the computer-readable storage 114 can be actively erased, there is no need to use only volatile memory that requires the presence of a power source in order to maintain its data. For example, the active erasure mechanisms described further below can be used in conjunction with a computer-readable storage 114 that comprises non-volatile memory, which can retain its data even in the absence of any electrical power. However, as will be obvious to those skilled in the art, the active erasure mechanisms are also equally applicable to volatile memory, which does require the presence of power to maintain data, as described above.

The digital timer 410 can be any type of digital timer, including simple summation circuitry, possibly driven by the Phase Locked Loop (PLL), or similar clock circuitry, of the controller 112, or a more complete digital timer with its own clock, registers, and complementary circuitry. As contemplated by one embodiment of the present invention, the digital timer 410 can be co-located with the controller 112 or with both the controller 112 and the hardware interface 110. Such an architecture could prevent attempts to maliciously retain the data in the computer-readable storage 114 by disrupting the timer signals to the controller 112.

As with the above described implementations, the digital timer 410 can be reset every time that the portable volatile computer-readable medium 400 is inserted into a computing device or peripheral. However, unlike the above described voltage controller 210, the digital timer 410 can be initiated, not merely based on the removal of an external power source, but upon more complex criteria. For example, if the controller 112 detects that no data has been transferred within a specified time window, it can initiate the digital timer 410 even though the portable volatile computer-readable medium 400 may still be connected to a computing device or peripheral. Similarly, the controller 112 can also receive explicit initiation signals, such as from one of the above-described wizards, indicating exactly when the digital timer 410 is to start.

The digital timer 410 can also be granted access to registers, either its own, or those of the controller 112, in order to store a predetermined time at which the contents of the computer-readable storage 114 are to be erased. As will be known by those skilled in the art, the predetermined time can be stored as a binary value and the timer can determine that the predetermined time has elapsed when the value of its counter exceeds that stored in the register.

Once the digital timer 410 determines that the predetermined time has elapsed, it can request the controller 112 to erase the data stored in the computer-readable storage 114. One mechanism, contemplated by an embodiment of the present invention, could simply leverage the existing functionality of the controller 112, and send a simple erase command conforming to whichever communication protocol is being used by the portable volatile computer-readable medium 200. An alternative mechanism, contemplated by another embodiment of the present invention, provides for additional circuitry as part of the digital timer 410 that can send detailed store and erase messages to the controller 112 to effectuate a more secure deletion of the data stored in the computer-readable storage 114. For example, the digital timer 410 can have dedicated circuitry which can communicate store and erase messages conforming to a Department of Defense (DoD) erase methodology to the controller 112. As will be known by those skilled in the art, DoD erase methodology can comprise multiple passes wherein the computer-readable storage is overwritten with binary 1s, binary 0s, or random data in each pass.

While FIGS. 2 and 4 have generally illustrated the portable volatile computer-readable media with standard cases, embodiments of the present invention contemplate the use of visual, tactile, or other physical clues that can be added to the cases to alert users to the volatile nature of the media. For example, a uniform alerting color could be used to signify volatile media intended for transporting security information and the like. Alternatively, a unique shape, such as a key shape, can be used to alert users and signal both the intended use of the volatile media, and its volatile nature. Additionally, a unique texture could be applied to the case 102 to alert visually impaired users to the volatile nature of the computer-readable media. Such a texture could be bumpy, rough, or otherwise differentiate the portable volatile computer-readable media from other portable nonvolatile computer-readable media. Furthermore, each of the above-described alternatives could be used in conjunction with one another to further the goal of alerting the user. Thus, the case 102 for a portable volatile computer-readable medium could have any combination of unique shape, color, texture, or any other sufficiently alerting physical property.

Figure 5:
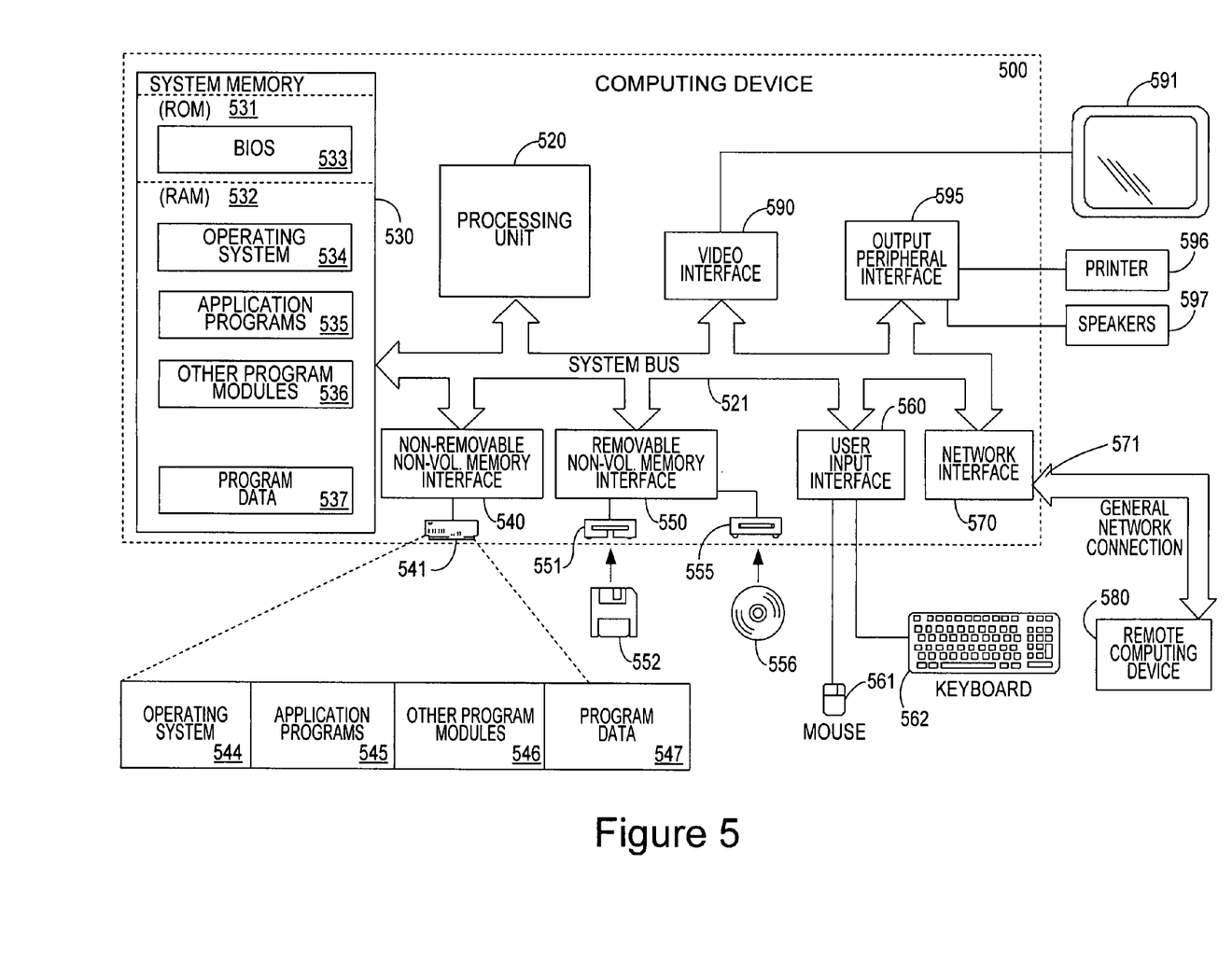
FIG. 5 is a block diagram generally illustrating an exemplary computing device with which embodiments of the present invention can be utilized.

Turning to FIG. 5, an exemplary computing device 500 with which embodiments of the invention may be used is shown. The computing device 500 is only one example of a suitable computing device and is not intended to suggest any limitation as to the scope of use or functionality of the invention. Components of computer device 500 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus. Furthermore, the processing unit 520 can contain one or more physical processors or processing cores.

Computing device 500 typically includes a variety of computer readable media. Computer readable media can be any available media that can be accessed by computing device 500 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computing device 500 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, including SD and CF cards, USB drives, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550. Additional computer-readable media, such as the flash memory cards or the USB drives described above can similarly be connected via interface 550, or other standard interfaces, including the Universal Serial Bus (USB interface) the IEEE 1394 interface, the PC Card interface, and the like.

The drives and their associated computer storage media discussed above and illustrated in FIG. 5 provide storage of computer readable instructions, data structures, program modules and other data for the computing device 500. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computing device 500 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through a output peripheral interface 595.

The computing device 500 can operate in a networked environment using logical connections to one or more remote computers. FIG. 5 illustrates a general network connection 571 to a remote computing device 580. The general network connection 571, and the network connections illustrated in FIG. 5, can be any of various different types of networks and network connections, including a Local Area Network (LAN), a Wide-Area Network (WAN), a wireless network, networks conforming to the Ethernet protocol, the Token-Ring protocol, or other logical, physical, or wireless networks including the Internet or the World Wide Web.

When used in a networking environment, the computing device 500 is connected to the general network connection 571 through a network interface or adapter 570, which can be a wired or wireless network interface card, a modem, or similar networking device. In a networked environment, program modules depicted relative to the computing device 500, or portions thereof, may be stored in the remote memory storage device. It will be appreciated that the network connections shown are exemplary and other means of establishing a communications link between the computers may be used.

Figure 6:
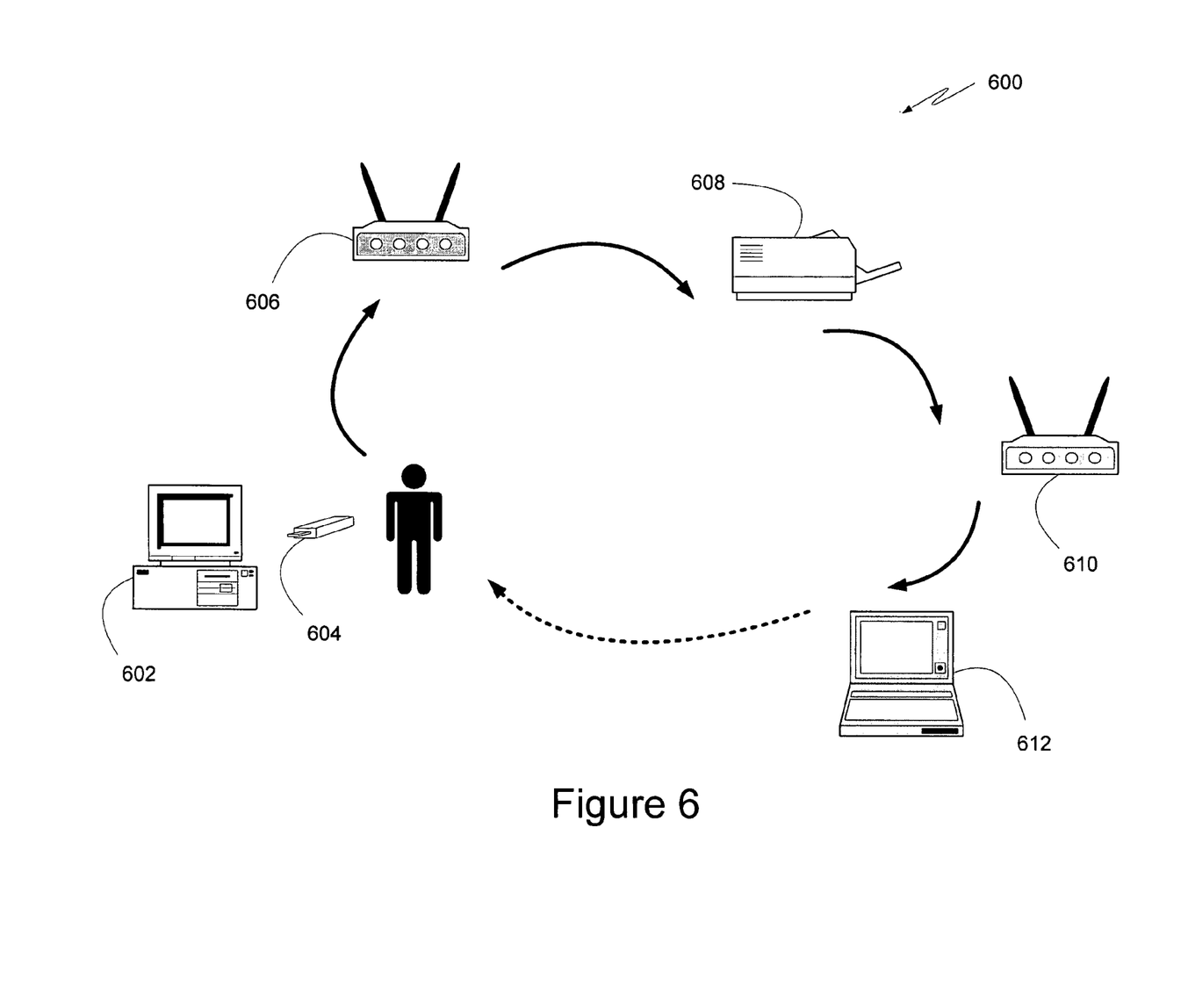
FIG. 6 is a wireless network setup diagram illustrating an exemplary use of embodiments of the present invention.

Turning to FIG. 6, one illustrative networking environment 600 is shown comprising a computing device 602, a portable computing device 612, a printer 608, and at least two wireless access points 606 and 610. As described previously, a user wishing to set up a wireless network comprising each of the devices illustrated in FIG. 6 faces a daunting task of correctly transferring the appropriate security information, including passwords, keys and the like to each of the devices. To aid the user, a wizard program on the computing device 602, for example, could guide the user through a series of steps and then select the necessary passwords, keys and other settings for the user. The wizard program could then store such information on a portable volatile computer-readable medium 604, which the user could physically carry to each of the remaining devices as shown in FIG. 6. Once the user inserts the portable volatile computer-readable medium 604 into a device, a wizard on that device can be automatically launched, and can read the necessary information off of the portable volatile computer-readable medium 604 and complete the necessary procedures to provision that device to access the wireless network the user wishes to set up. For example, when the user inserts the portable volatile computer-readable medium 604 into the wireless access point 606, the wireless access point can automatically, upon insertion, launch a setup wizard program that can search the portable volatile computer-readable medium 604 for appropriate information. The wizard program can the set up the wireless access point 606 to use the specified wireless protocols, channels, and wireless security, including, for example, providing the specified Media Access Control (MAC) address filtering and using the specified Wireless Encryption Protocol (WEP) keys. An analogous process could be performed on each of the devices 608, 610 and 612 as well, thereby creating a wireless network for the user with a minimum of effort on the part of the user and, a minimal security risk should the user loose or misplace the portable volatile computer-readable medium 604.

FIG. 6 also illustrates an optional step whereby the user can return the portable volatile computer-readable medium 604 to the computing device 602. Specifically, each of the devices 606, 608, 610 and 612 can also write data back to the portable volatile computer-readable medium 604. For example, the devices can record a log of their actions, a list of any errors that were encountered, or alternative setup information, such as alternative protocols, passwords, keys, including keys associated with two-way authentication, and the like. By returning the portable volatile computer-readable medium 604 to the computing device 602, the user can receive a detailed analysis from the computing device 602, which can read the data stored on the portable volatile computer-readable medium 604 by the other device and indicate to the user the successes or failures encountered in setting up the networking environment 600.

A portable volatile computer-readable medium can also be useful to set up ad-hoc wireless networks, especially in public locations where the risk of losing the portable volatile computer-readable medium is increased. For example, two or more users who have portable computing devices with wireless networking hardware can exchange the necessary data, including information regarding protocols, channels, passwords, and security keys by simply connecting a portable volatile computer-readable medium first to one portable computing device, and then to the others, in a manner analogous to the setup illustrated in FIG. 6.

Alternatively, a portable volatile computer-readable medium can be used to provision inexpensive computing devices that rely on a networking environment in order to access necessary information. Such "thin clients", as they are commonly referred to, can be set up via a portable volatile computer-readable medium that contains, not only the appropriate networking and security information, but also all of the software that such a thin client might require or use. While most of the above described examples require only a few megabytes at most to store all of the required data, provisioning thin clients may require significantly more memory. However, because the above described techniques leverage existing manufacturing capabilities, a portable volatile computer-readable medium comprising several gigabytes of storage is practically achievable, and smaller capacities can be manufactured for significantly less cost.

Figure 7:
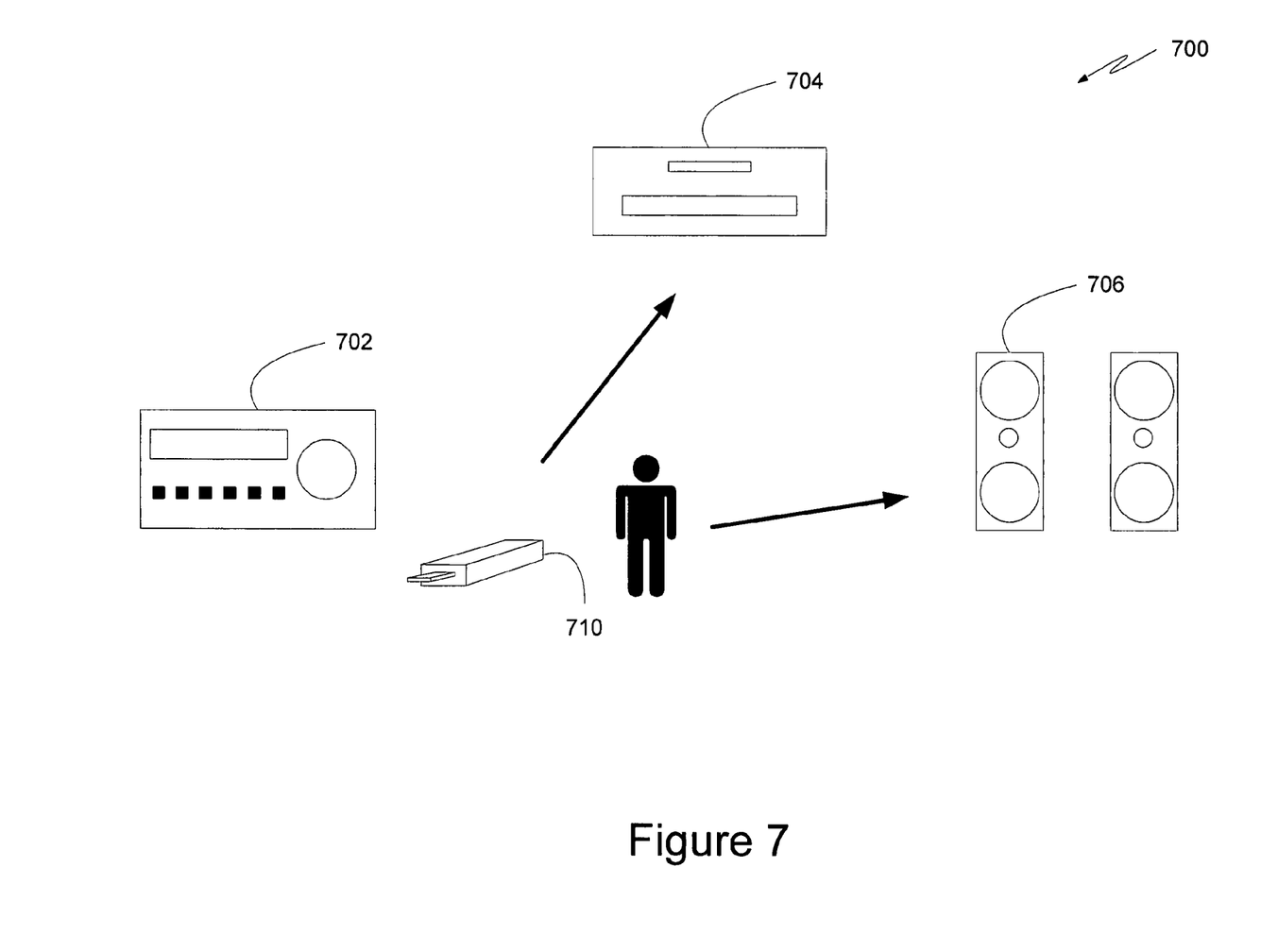
FIG. 7 is a universal plug and play setup diagram illustrating an exemplary use of embodiments of the present invention.

Turning to FIG. 7, a UPnP environment 700 is illustrated comprising a UPnP control point in the form of an audio/video receiver 702, a UPnP device in the form of a DVD video player 704, and another UPnP device in the form of a pair of powered speakers 706. A portable volatile computer-readable medium 710 can be used, not merely to transfer setup information, as illustrated and described in detail above, but it can also be used to simply transfer a password or security key from one device to another, saving the user the hassle of locating and accurately transcribing the key. For example, as will be known by those skilled in the art, when the user first connects his DVD player 704 to the environment 700, the DVD player 704 may require that the user enter the receiver's security code as part of the UPnP setup procedure. If the user has installed the DVD player 704 in another room, the user will be forced to first transcribe the security code onto paper, and then enter it into the receiver 702. Furthermore, since the user has likely already set up and installed the receiver 702, the user may not be able to conveniently access the security code, which is often located on the back or bottom of such units. However, with the portable volatile computer-readable medium 710, the user can simply insert the portable volatile computer-readable medium 710 into an appropriate connector on the receiver 702, have the security code copied to it, and then insert the portable volatile computer-readable medium 710 into the DVD player 704 in order to provide the code to the DVD player 704. The security code can similarly be provided to the speakers 706, should they require the code as part of the setup procedure.

As can be seen, by using a timed erasure mechanism, the security risks attendant in using portable media to store and transport passwords, codes, keys, and other setup information can be minimized. The addition of a timed erasure mechanism, such as the above described voltage controller or digital timer, effectively transforms any portable computer-readable media into portable volatile computer-readable media. Furthermore, known manufacturing techniques can be leveraged to produce such portable volatile computer-readable media in an inexpensive manner, and the containers of such media can comprise appropriate physical features to alert users to the volatile nature of the media.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A portable volatile computer-readable medium comprising:
   a hardware interface implementing, via a connector between the medium and a configurable device selectively coupled to the medium by the hardware interface, a bi-directional communication protocol, the hardware interface configured to operate according to the Universal Plug and Play (UPnP) standard and to cooperate with a wizard program on the configurable device, which wizard program is operable to interact with a user and to retrieve data from the medium for use in configuring one or more applications on the configurable device;
   storage circuitry; and
   a timed erasure mechanism, wherein the timed erasure mechanism destroys data stored in the storage circuitry after a predetermined amount of time has elapsed from an initiating event,
   wherein the timed erasure mechanism comprises a digital timer and an erase algorithm that instructs a controller to erase the data stored in the storage circuitry after the predetermined amount of time has elapsed from the initiating event, and wherein further the digital timer was restarted at the initiating event.

2. The portable volatile computer-readable medium of claim 1, wherein the storage circuitry requires the presence of power to maintain the data stored in the storage circuitry, and wherein the timed erasure mechanism is associated with a power supply that is discharged in accordance with the predetermined amount of time, and wherein further the data stored in the storage circuitry is destroyed by supplying an insufficient amount of power from the power supply such that the data stored in the storage circuitry is corrupted.

3. The portable volatile computer-readable medium of claim 2 further comprising a data access controller that checks the data stored in the storage circuitry for corruption and denies access to the data stored in the storage circuitry if the data is corrupted.

4. The portable volatile computer-readable medium of claim 1, wherein the predetermined amount of time is established by storing an appropriate time value in a register, the contents of which are compared to the digital timer to determine if the predetermined amount of time has elapsed from the initiating event.

5. The portable volatile computer-readable medium of claim 1, wherein the erase algorithm instructs the controller to erase the data stored in the storage circuitry by instructing the controller to perform a series of data manipulations in accordance with a secure erasure protocol.

6. The portable volatile computer-readable medium of claim 1, wherein the timed erasure mechanism and the controller are co-located.

7. The portable volatile computer-readable medium of claim 1, wherein the initiating event is a most-recent removal of an external power source from the portable volatile computer-readable medium.

8. The portable volatile computer-readable medium of claim 1, wherein the initiating event is an explicit instruction from a setup program using the portable volatile computer-readable medium.

9. The portable volatile computer-readable medium of claim 1 further comprising a container with distinctive physical attributes intended to alert a user to the timed erasure mechanism.

10. A timed erasure mechanism for use with a portable computer-readable medium comprising a hardware connector for connecting the portable computer-readable medium with a configurable device, a hardware interface implementing a bi-directional communication protocol compatible with the hardware connector and configured to cooperate with a wizard program on the configurable device, the wizard program operable to interact with a user and to retrieve data from the medium for use in configuring one or more applications on the configurable device, nonvolatile storage circuitry, and a controller, the timed erasure mechanism comprising a digital timer, an erase algorithm, and a connection to the controller, wherein the erase algorithm instructs the controller to erase data stored in the nonvolatile storage circuitry after a predetermined amount of time has elapsed from an initiating event.

11. The timed erasure mechanism of claim 10, wherein the predetermined amount of time is established by storing an appropriate time value in a register, the contents of which are compared to the digital timer to determine if the predetermined amount of time has elapsed from the initiating event, and wherein further the digital timer is restarted at the initiating event.

12. The timed erasure mechanism of claim 10, wherein the erase algorithm instructs the controller to erase the data stored in the nonvolatile storage circuitry by instructing the controller to perform a series of data manipulations in accordance with a secure erasure protocol.

13. The timed erasure mechanism of claim 10, wherein the initiating event is a most-recent removal of an external power source from the timed erasure mechanism.

14. The timed erasure mechanism of claim 10, wherein the initiating event is an explicit instruction from a setup program using the portable computer-readable medium.

15. The timed erasure mechanism of claim 10, wherein the timed erasure mechanism is located within a container that also comprises the portable computer-readable medium, the container possessing distinctive physical attributes intended to alert a user to the timed erasure mechanism.

16. A portable computer-readable medium comprising:
- a hardware connector for connecting the portable computer-readable medium with each of a first device at a first time and a configurable device at a second time;
- a hardware interface implementing a bi-directional communication protocol compatible with each of the hardware connector, the first device, and the configurable device;
- storage circuitry configured to store first data written by the first device and second data written by the configurable device, wherein the configurable device reads the first data and writes the second data, and further wherein the first device is operable to read and analyze the second data when the computer-readable medium is connected to the first device at a third time; and
- a timed erasure mechanism, wherein the timed erasure mechanism destroys at least a selected portion of the first and second data stored in the storage circuitry after a predetermined amount of time has elapsed from an initiating event,
- wherein the timed erasure mechanism comprises a digital timer and an erase algorithm that instructs a controller to erase the selected data stored in the storage circuitry after the predetermined amount of time has elapsed from the initiating event, and wherein further the digital timer was restarted at the initiating event.

* * * * *